US009910613B2

United States Patent
Rao et al.

(10) Patent No.: US 9,910,613 B2
(45) Date of Patent: Mar. 6, 2018

(54) VOLUME ADMISSION CONTROL FOR HIGH-PERFORMANCE DISTRIBUTED DATA STORAGE SYSTEM

(71) Applicant: eBay Inc., San Jose, CA (US)

(72) Inventors: Vinay Pundalika Rao, San Jose, CA (US); Mark S. Lewis, Pleasanton, CA (US); Anna Povzner, San Jose, CA (US)

(73) Assignee: eBay Inc., San Jose, CA (US)

( * ) Notice: Subject to any disclaimer, the term of this patent is extended or adjusted under 35 U.S.C. 154(b) by 268 days.

(21) Appl. No.: 14/673,723

(22) Filed: Mar. 30, 2015

(65) Prior Publication Data

US 2016/0291892 A1  Oct. 6, 2016

(51) Int. Cl.
G06F 3/06 (2006.01)

(52) U.S. Cl.
CPC .......... *G06F 3/0629* (2013.01); *G06F 3/0604* (2013.01); *G06F 3/065* (2013.01); *G06F 3/067* (2013.01); *G06F 3/0607* (2013.01); *G06F 3/0613* (2013.01); *G06F 3/0631* (2013.01); *G06F 3/0683* (2013.01)

(58) Field of Classification Search
None
See application file for complete search history.

(56) References Cited

U.S. PATENT DOCUMENTS

| 2011/0238546 A1* | 9/2011 | Certain | G06Q 10/00 705/34 |
| 2013/0024481 A1* | 1/2013 | Bolesta | G06F 3/0665 707/812 |

* cited by examiner

*Primary Examiner* — Brian Peugh
*Assistant Examiner* — Edmund Kwong
(74) *Attorney, Agent, or Firm* — Schwegman Lundberg & Woessner, P.A.

(57) ABSTRACT

New storage volumes are registered to a data storage environment. Registering new storage volumes is controlled based on the performance requirements of the storage volumes compared to the capacity of the data storage environment.

20 Claims, 5 Drawing Sheets

VOLUME ADMISSION CONTROL FOR HIGH-PERFORMANCE DISTRIBUTED DATA STORAGE SYSTEM

BACKGROUND

1. Technical Field

The present invention generally relates to the field of data storage and, more particularly, to the registration of new storage volumes to a storage system.

2. Background Information

Consider a data storage system where the system stores and services multiple storage volumes for multiple clients. Each storage volume may have specified different performance requirements for its I/O requests. In order to provide a better experience for the clients, the system should allocate the storage volumes in a manner that meets the specified requirements of the clients and efficiently uses storage devices to meet the specified requirements. In particular, when new storage volumes are requested, the new storage volumes preferably should not be stored on storage devices in a manner that is inconsistent with the clients' performance requirements.

SUMMARY

The above and other issues are addressed by a computer-implemented method, non-transitory computer-readable storage medium, and computer system for registering new storage volumes to a data storage environment. Registering new storage volumes is controlled based on the performance requirements of the storage volumes compared to the capacity of the data storage environment.

In one aspect, a request is received to register a new storage volume to a subcluster that contains one or more storage nodes. The subcluster may already have admitted other storage volumes. Quality of service (QOS) parameters specify one or more I/O operations per second (IOPS) requirements for the storage volumes. Examples include parameters specifying the minimum required IOPS and/or the maximum required IOPS. It is determined whether an IOPS capacity of the subcluster is sufficient to accommodate addition of the IOPS requirement for the new storage volume. If the IOPS capacity of the subcluster is sufficient, then the new storage volume is registered to the subcluster.

Other aspects include components, devices, systems, improvements, methods, processes, applications, computer readable mediums, and other technologies related to any of the above.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
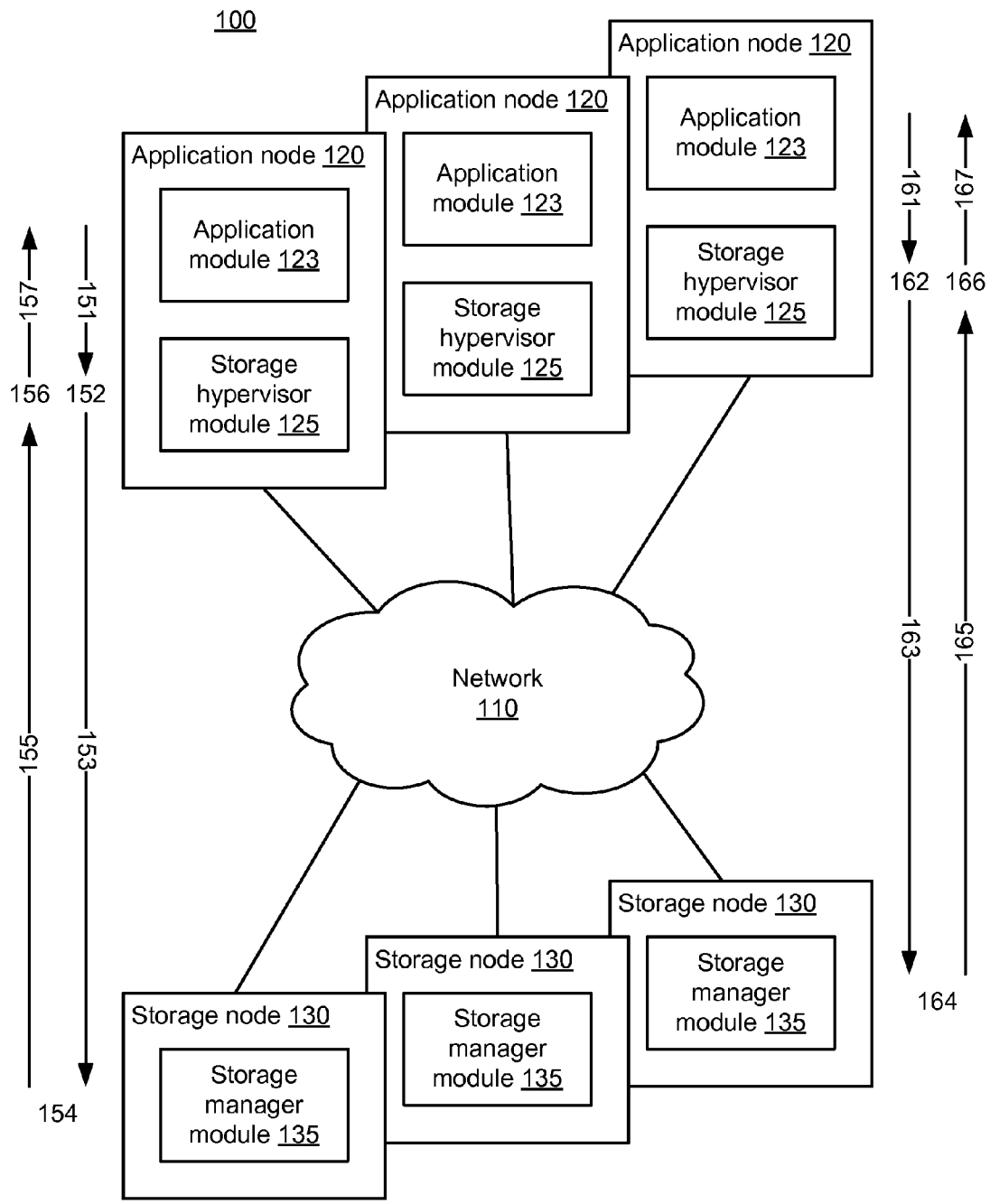
FIG. 1 is a high-level block diagram illustrating an environment for storing data, according to one embodiment.

FIG. 1 is a high-level block diagram illustrating an environment 100 for storing data, according to one embodiment. An example of such an environment is described in further detail in U.S. patent application Ser. No. 13/957,849, "High-performance distributed data storage system with implicit content routing and data deduplication" (case 24156), which is incorporated herein by reference in its entirety. The environment 100 may be maintained by an enterprise, such as a corporation, university, or government agency. As shown, the environment 100 includes a network 110, multiple application nodes 120, and multiple storage nodes 130. While three application nodes 120 and three storage nodes 130 are shown in the embodiment depicted in FIG. 1, other embodiments can have different numbers of application nodes 120 and/or storage nodes 130.

The network 110 represents the communication pathway between the application nodes 120 and the storage nodes 130. In one embodiment, the network 110 uses standard communications technologies and/or protocols and can include the Internet. Thus, the network 110 can include links using technologies such as Ethernet, 802.11, InfiniBand, PCI Express Advanced Switching, etc. Similarly, the networking protocols used on the network 110 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 110 can be represented using technologies and/or formats including image data in binary form (e.g. Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 110 can use custom and/or dedicated data communications technologies instead of, or in addition to, the ones described above.

An application node 120 is a computer (or set of computers) that provides standard application functionality and data services that support that functionality. The application node 120 includes an application module 123 and a storage hypervisor module (SH module) 125. The application module 123 provides standard application functionality such as serving web pages, archiving data, or data backup/disaster recovery. In order to provide this standard functionality, the application module 123 issues write requests (i.e., requests to store data) and read requests (i.e., requests to retrieve data). The storage hypervisor module 125 handles these application write requests and application read requests. The storage hypervisor module 125 is further described below with reference to FIG. 3.

A storage node 130 is a computer (or set of computers) that stores data. The storage node 130 can include one or more types of storage, such as hard disk, optical disk, flash memory, and cloud. The storage nodes 130 can be multi-layer and/or virtual, for example as described in U.S. patent application Ser. No. 14/074,584, "Multi-layer Data Storage Virtualization Using a Consistent Data Reference Model" (case 24159), which is incorporated herein by reference in its entirety. The storage node 130 includes a storage manager module (SM module) 135. The storage manager module 135 handles data requests received via the network 110 from the storage hypervisor module 125 (e.g., storage hypervisor write requests and storage hypervisor read requests). This typically includes reading and writing to storage devices, and bookkeeping functions such as updating tables of what data is located where. The storage manager module 135 is further described below with reference to FIG. 4.

Typically, stored data is divided into storage volumes. Clients, through the application nodes 120, typically will request creation of storage volumes for the storage of their data. Storage volumes may have associated performance requirements, such as minimum I/O operations per second (IOPS), maximum IOPS and priority level. These may be specified in service level agreements, for example. The storage volumes are assigned to storage node(s) 130 and may be spread across multiple storage nodes and storage devices within those storage nodes. The performance requirements may be different for different storage volumes, even though multiple storage volumes may be stored on the same storage node or on the same storage device.

The data itself is represented as data objects (DO). Unlike many types of storage, data objects can vary widely in size and characteristics. Examples of data objects include emails, images, audio files, video files, system logs, key-value store data, volume blocks, unstructured data, data structured specifically for certain database or other applications, etc. An application data identifier is the identifier used by the application module 123 to refer to the data object within the application. The application data identifier can be, for example, a file name, an object name, or a range of blocks. A data object identification (DOID) is a unique address that is used as the primary reference for placement and retrieval of the data object within the storage nodes 130. The storage hypervisor module 125 translates between application data identifier and DOID.

Basic read/write operation of system 100 is as follows. With respect to writing data to storage, the application module 123 sends an application write request 151 to the storage hypervisor module 125. The application write request includes a data object (DO) and an application data identifier. The storage hypervisor module 125 determines 152 one or more storage nodes 130 on which the DO should be stored and determines 152 a pending DOID corresponding to the application data identifier. The SH module 125 sends a storage hypervisor (SH) write request 153 to the storage nodes 130. The SH write request includes the data object and the DOID. In step 154, the SM module 135 finalizes the pending DOID, stores the DO and updates a local catalog by adding an entry mapping the DO's finalized DOID to the actual storage location where the DO was stored. The SM module 135 sends an acknowledgment 155 to the SH module 125, which does some local bookkeeping 156 and sends an acknowledgment 157 to the to the application module 123.

Reading data from storage operates similarly. The application module 123 sends an application read request 161 to the SH module 125. The application read request includes an application data identifier. The storage hypervisor module 125 determines 162 one or more storage nodes 130 on which the DO is stored and determines 162 the DOID corresponding to the application data identifier. The SH module 125 sends a storage hypervisor (SH) read request 163 to the appropriate storage nodes 130. The SH read request includes the DOID. In step 164, the SM module 135 determines the actual storage location from the DOID and retrieves the data object. The SM module 135 sends 165 the data object to the SH module 125, which does some local bookkeeping 166 and sends 167 the data object to the application module 123.

Note that in both read and write operations, while DOIDs are used by the SH module 125 and the SM module 135, DOIDs are not used by the application module 123. Instead, the application module 123 refers to data using application data identifiers. The SH module 125 converts between DOIDs and application data identifiers.

Also note that many application modules 123 may be requesting read and write of many data objects from many storage volumes spanning many storage nodes 130 and storage devices. These I/O requests preferably are prioritized in a manner that meets performance requirements for the different storage volumes. Examples of different approaches are described in U.S. patent application Ser. No. 14/229,690, "Efficient scalable I/O scheduling" (case 25875) and Ser. No. 14/613,779, "Dynamic Storage Tiering Based on Performance SLAs" (case 27845), which are incorporated herein by reference in their entirety. In addition, redundancy or replication may also be implemented in the data storage, for example as described in Ser. No. 14/495,431, "Assigning storage responsibility in a distributed data storage system with replication" (case 26555), which is incorporated herein by reference in its entirety.

Figure 2:
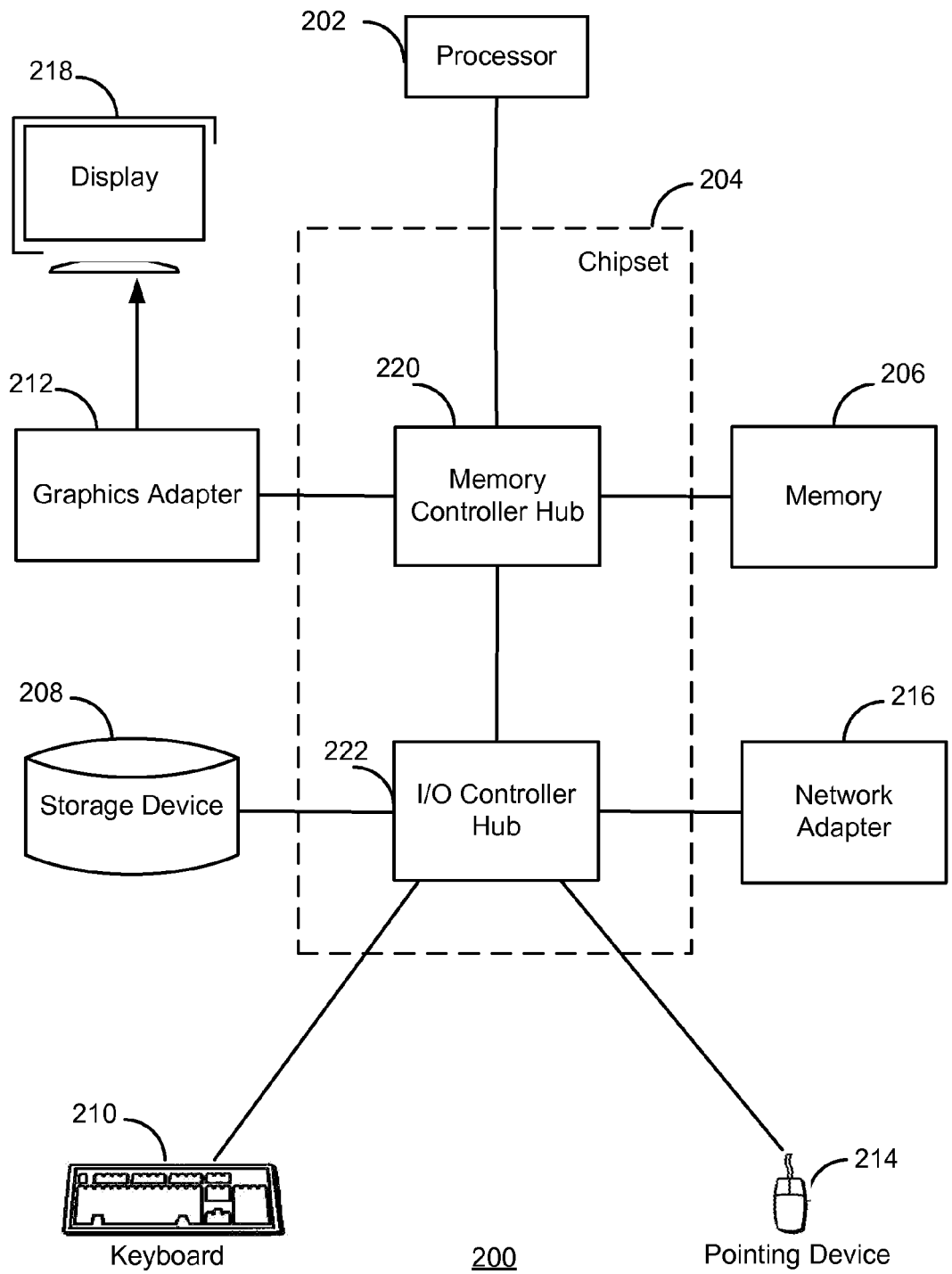
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the application node 120 and/or the storage node 130 can be formed of multiple blade servers and lack a display device, keyboard, and other components.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
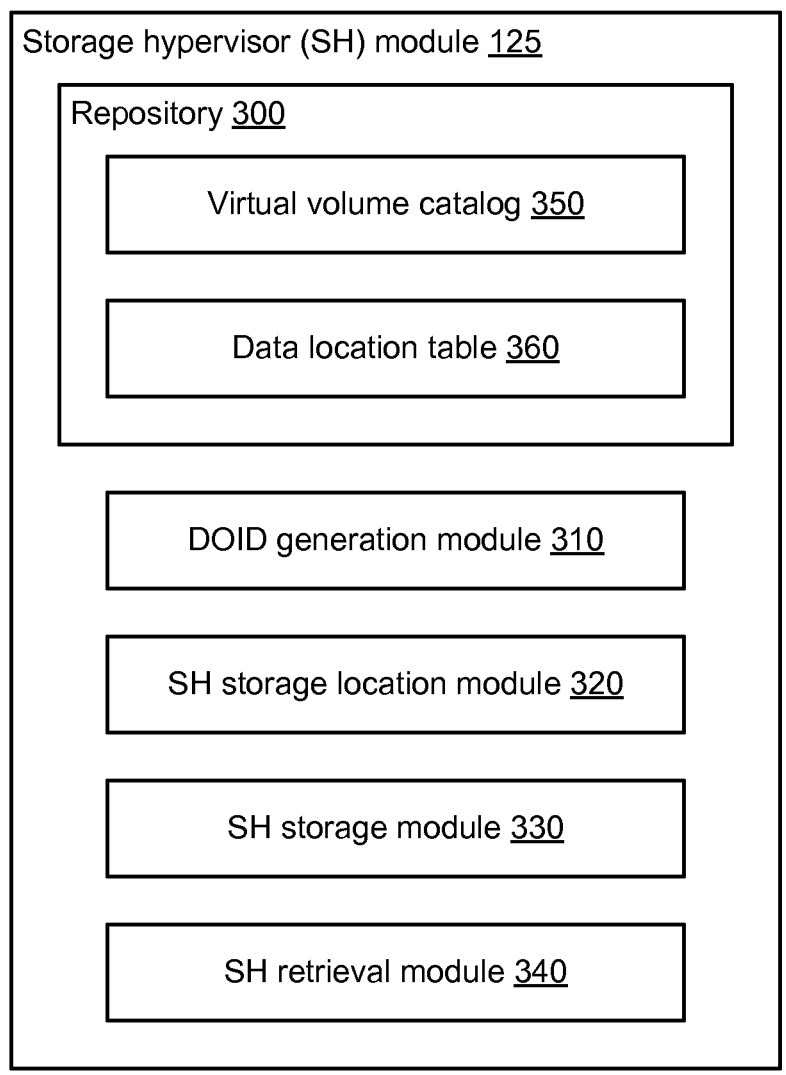
FIG. 3 is a high-level block diagram illustrating the storage hypervisor module from FIG. 1, according to one embodiment.

FIG. 3 is a high-level block diagram illustrating the storage hypervisor module 125 from FIG. 1, according to one embodiment. The storage hypervisor (SH) module 125 includes a repository 300, a DOID generation module 310, a storage hypervisor (SH) storage location module 320, a storage hypervisor (SH) storage module 330, and a storage hypervisor (SH) retrieval module 340.

The repository 300 stores a virtual volume catalog 350 and a data location table 360. The virtual volume catalog 350 stores mappings between application data identifiers and data object identifications (DOIDs). One application data identifier is mapped to one DOID. The DOID is a unique address that is used as the primary reference for placement and retrieval of a data object (DO). Updates to the virtual volume catalog 350 may be stored by one or more storage nodes 130. This embodiment provides a redundant, non-volatile, consistent replica of the virtual volume catalog 350 data within the environment 100. In this embodiment, when a storage hypervisor module 125 is initialized or restarted, the appropriate copy of the virtual volume catalog 350 is loaded from a storage node 130 into the storage hypervisor module 125. In one embodiment, the storage nodes 130 are assigned by volume ID (i.e., by each unique storage volume), as opposed to by DOID. In this way, all updates to the virtual volume catalog 350 will be consistent for any given storage volume.

The data location table 360 stores data object placement information, such as mappings between DOID Locators ("DOID-Ls", the first 4 bytes of DOIDs in this example) and storage nodes. One DOID-L is mapped to one or more storage nodes (indicated by storage node identifiers). The one to many mapping can be used to implement redundancy. A storage node identifier is, for example, an IP address or another identifier that can be directly associated with an IP address. In one embodiment, the mappings are stored in a relational database to enable rapid access.

In one embodiment, a DOID-L is a four-byte value that can range from [00 00 00 00] to [FF FF FF FF], which provides more than 429 million individual data object locations. Since the environment 100 will generally include fewer than 1000 storage nodes, a storage node would be allocated many (e.g., thousands of) DOID-Ls to provide a good degree of granularity. In general, more DOID-Ls are allocated to a storage node 130 that has a larger capacity, and fewer DOID-Ls are allocated to a storage node 130 that has a smaller capacity.

The DOID generation module 310 takes as input a data object (DO), generates a data object identification (DOID) for that object, and outputs the generated DOID. In one embodiment, the DOID generation module 310 generates the DOID in part based on hashing the content of the data object. The storage hypervisor (SH) storage location module 320 takes as input a data object identification (DOID), determines the one or more storage nodes associated with the DOID, and outputs the one or more storage nodes (indicated by storage node identifiers). The storage hypervisor (SH) storage module 330 takes as input an application write request, processes the application write request, and outputs a storage hypervisor (SH) write acknowledgment. The storage hypervisor (SH) retrieval module 340 takes as input an application read request, processes the application read request, and outputs a data object (DO).

Figure 4:
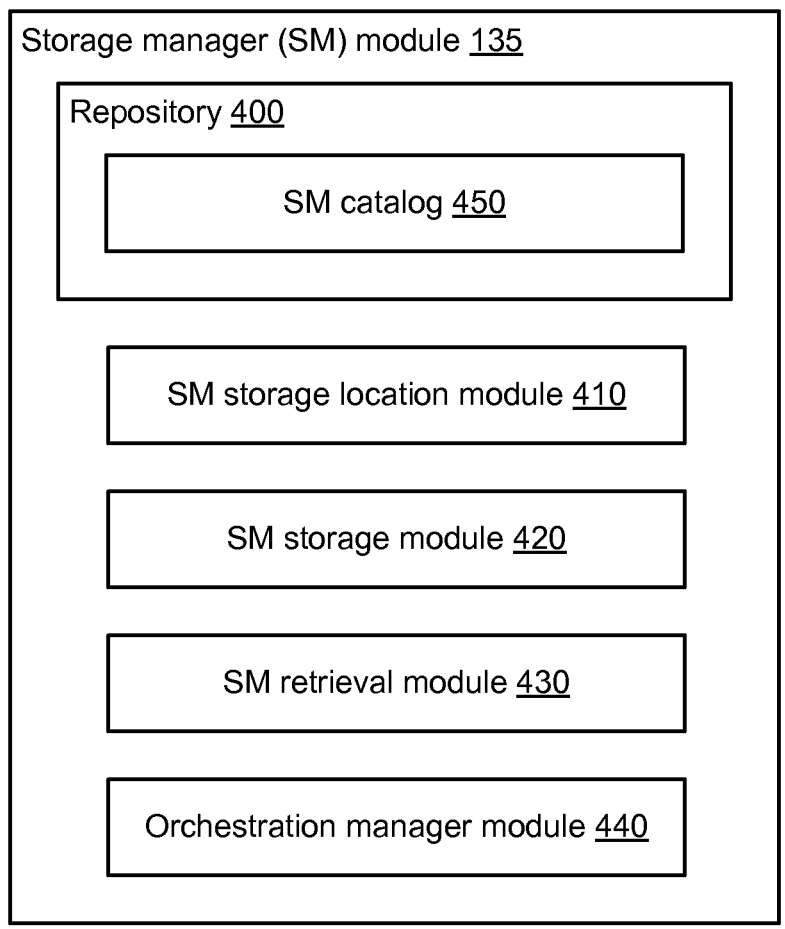
FIG. 4 is a high-level block diagram illustrating the storage manager module from FIG. 1, according to one embodiment.

FIG. 4 is a high-level block diagram illustrating the storage manager module 135 from FIG. 1, according to one embodiment. The storage manager (SM) module 135 includes a repository 400, a storage manager (SM) storage location module 410, a storage manager (SM) storage module 420, a storage manager (SM) retrieval module 430, and an orchestration manager module 440.

The repository 400 stores a storage manager (SM) catalog 440. The storage manager (SM) catalog 440 stores mappings between data object identifications (DOIDs) and actual storage locations (e.g., on hard disk, optical disk, flash memory, and cloud). One DOID is mapped to one actual storage location. For a particular DOID, the data object (DO) associated with the DOID is stored at the actual storage location.

The storage manager (SM) storage location module 410 takes as input a data object identification (DOID), determines the actual storage location associated with the DOID, and outputs the actual storage location. The storage manager (SM) storage module 420 takes as input a storage hypervisor (SH) write request, processes the SH write request, and outputs a storage manager (SM) write acknowledgment. This processing includes resolving hash collisions. The storage manager (SM) retrieval module 430 takes as input a storage hypervisor (SH) read request, processes the SH read request, and outputs a data object (DO).

The orchestration manager module 440 performs storage allocation and tuning among the various storage nodes 130. Only one storage node 130 within the environment 100 needs to include the orchestration manager module 440. However, in one embodiment, multiple storage nodes 130 within the environment 100 (e.g., four storage nodes) include the orchestration manager module 440. In that embodiment, the orchestration manager module 440 runs as a redundant process.

Storage nodes 130 can be added to (and removed from) the environment 100 dynamically. Adding (or removing) a storage node 130 will increase (or decrease) linearly both the capacity and the performance of the overall environment 100. When a storage node 130 is added, data objects are redistributed from the previously-existing storage nodes 130 such that the overall load is spread evenly across all of the storage nodes 130, where "spread evenly" means that the overall percentage of storage consumption will be roughly the same in each of the storage nodes 130. In general, the orchestration manager module 440 balances base capacity by moving DOID-L segments from the most-used (in percentage terms) storage nodes 130 to the least-used storage nodes 130 until the environment 100 becomes balanced.

Recall that the data location table 360 stores mappings (i.e., associations) between DOID-Ls and storage nodes. The aforementioned data object redistribution is indicated in the data location table 360 by modifying specific DOID-L associations from one storage node 130 to another. Once a new storage node 130 has been configured and the relevant data object has been copied, a storage hypervisor module 125 will receive a new data location table 360 reflecting the new allocation. Data objects are grouped by individual DOID-Ls such that an update to the data location table 360 in each storage hypervisor module 125 can change the storage node(s) associated with the DOID-Ls. Note that the existing storage nodes 130 will continue to operate properly using the older version of the data location table 360 until the update process is complete. This proper operation enables the overall data location table update process to happen over time while the environment 100 remains fully operational.

In one embodiment, the orchestration manager module 440 also controls the registration of new storage volumes. As described previously, storage volumes may come with specified performance requirements. Performance requirements are often expressed as quality of service (QOS) parameters. Examples of QOS parameters include service level agreements or performance specified in service level agreements, I/O priority, and minimum and maximum input/output operations per second (IOPS). Service level agreements may specify minimum down time, maximum recovery time, maximum latency, etc. I/O priority is typically some sort of priority order. For example, storage volumes with I/O priority 1 may have priority over those with I/O priority 2, which have priority over those with I/O priority 3, etc. Minimum IOPS typically is the minimum throughput which must be available from the data storage environment at all times. In other words, the data storage environment must be able to support a situation where the storage volume is continuously operating at the minimum IOPS rate. Maximum IOPS typically specifies a burst rate which must be available from the data storage environment. If the storage volume has burst activity up to the maximum IOPS rate, the data storage environment must support that burst activity. However, it is not required to support burst activity above this rate nor is it required to support this rate for long periods of time or for continuous operation.

Figure 5:
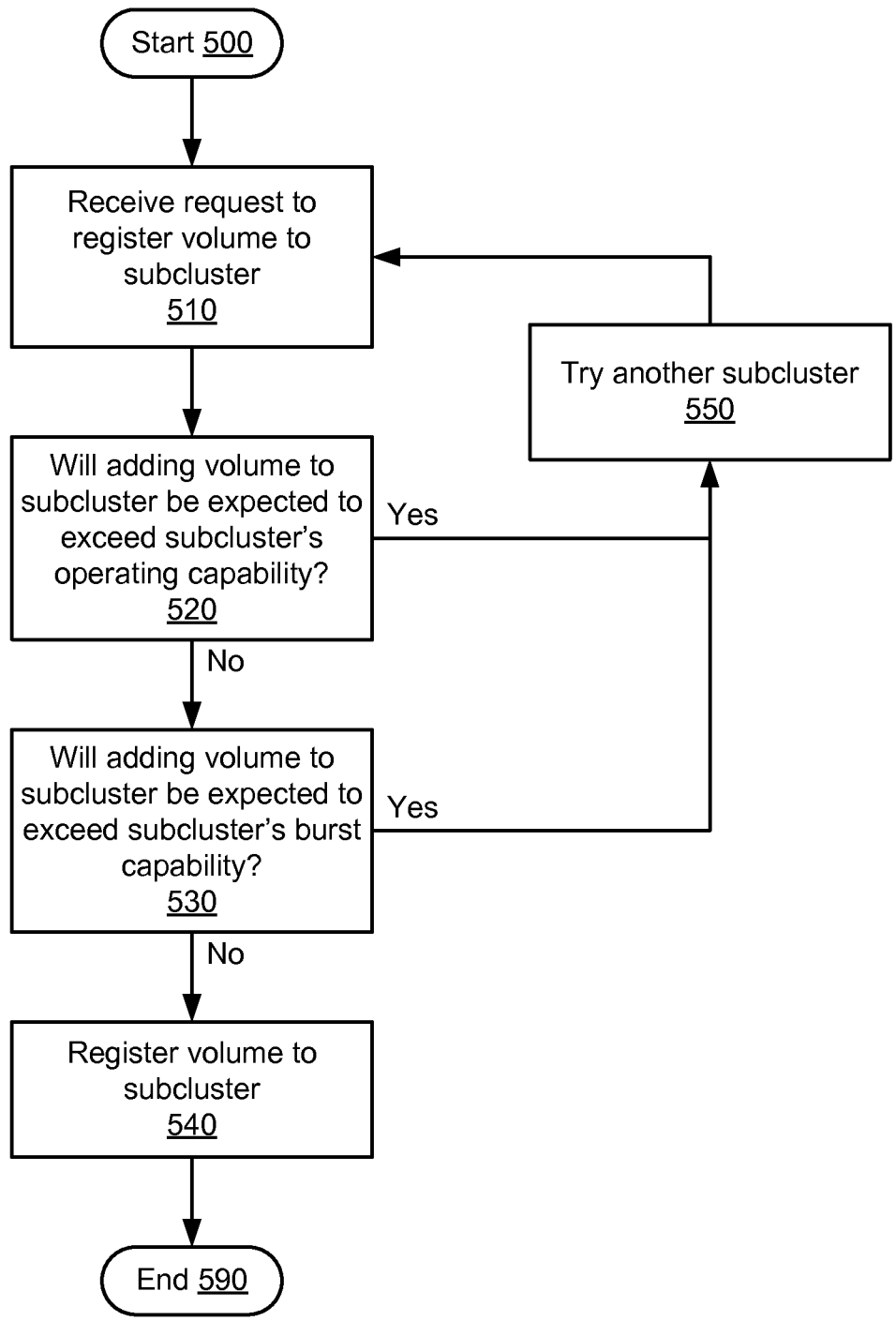
FIG. 5 is a flow diagram illustrating control of registration of storage volumes, according to one embodiment.

FIG. 5 is a flow diagram illustrating control of registration of storage volumes, according to one embodiment. In this example, the storage nodes are organized into subclusters. An application module requests 510 to register a new storage volume. The orchestration manager module 440 must determine whether to allow the registration or not. It first determines whether the IOPS capacity for the subcluster is sufficient to accommodate addition of the new storage volume. If so, then the request to register the new storage volume to the subcluster is granted. If not, then the request is denied and preferably a notification is also provided.

FIG. 5 shows an example of how this determination may be made. In step 520, the orchestration manager module 440 determines whether adding the new storage volume would be expected to exceed the subcluster's steady state or normal operating capacity. This is the IOPS capacity during normal, continuous operation. In step 520, the orchestration manager module 440 determines whether adding the new storage volume would be expected to exceed the subcluster's burst or peak capacity. This is the subcluster's ability to handle bursts in IOPS activity. If both determinations are favorable, then the new storage volume can be registered 540 to the subcluster. If not, then another subcluster may be tried 550.

The following is a specific mathematical example. Assume there are N storage nodes that operate together as a subcluster. Each storage node n has an IOPS capacity given by IOPC(n). The IOPS capacity for the subcluster is given by $$IOPC = \Sigma_n IOPC(n) \quad (1)$$

where the summation is over all storage nodes n. This can be adjusted as $$IOPC = \Sigma_n IOPC(n)/AvgRepFactor \quad (2)$$

where AvgRepFactor is an indication of the number of times that data in storage volumes are replicated on the subcluster. For example, if all data is stored in triplicate, then the effective IOPS capacity will decrease. When new data is written, it is written to three locations, requiring three times the bandwidth, effectively reducing the rate of write operations by three. Reading data does not require reading from three locations, so the overall IOPC may not be reduced by exactly three, but it will be decreased. In some embodiments, AvgRepFactor=3 is a good starting point. Note also that IOPC will be affected as storage nodes come on-line and go out of service.

Further assume there are K storage volumes already registered to the subcluster. Each storage volume k is characterized by QOS parameters, which include a minimum IOPS requirement IOPSmin(k) and a maximum (burst) IOPS requirement IOPSmax(k). Now, a request is made to register a new storage volume with the subcluster. Consider two different criteria: one concerning continuous operation and IOPSmin and the other concerning burst operation and IOPSmax.

Continuous Operation.

This criteria determines whether the IOPS capacity of the subcluster is sufficient to support the minimum IOPS requirements for all storage volumes registered to the subcluster. Mathematically, one formulation is $$\Sigma_k IOPSmin(k) + IOPSmin(new) \leq LoadFactor * IOPC \quad (3)$$

Here, IOPSmin(k) are the minimum IOPS requirements for the existing storage volumes and IOPSmin(new) is the minimum IOPS requirements for the new storage volume. IOPC is the IOPS capacity of the subcluster, as given by Eqs. 1 or 2. LoadFactor is a factor, which is indicative of how much quiescent IOPS load is allowed to exist in the system. A load factor less than 1 provides some safety margin during continuous operation, thus guaranteeing the minimum IOPS will be supported. For under provision, a load factor in a range of 0.50-0.75 can be used, for example 0.70. Over provision can also be implemented, for example if the IOPSmin requirements are soft requirements (i.e., not required to be met) or are unusually high. For example, if much of the traffic is best effort traffic, rather than guaranteed rate traffic, then the load factor can be greater than 1, say 2-3.

Burst Activity.

Allow for bursting but not at the cost of sacrificing IOPSmin for any storage volume and also not at the cost of overloading the whole system so much as to require overload controls. In other words, this approach allows for bursts when it is safe to do so. However, when all the storage volumes are bursting at the same time, it should still not saturate the system. Mathematically, the criteria is given by $$\Sigma_k IOPSmin(k) + BurstFactor*(IOPSmax(k) - IOPSmin(k)) + IOPSmin(new) + BurstFactor*(IOPSmax(new) - IOPSmin(new)) \leq IOPC \quad (4)$$

Here, BurstFactor is a burst factor that is indicative of how bursty the traffic is. For example, BurstFactor may be the probability of burst activity for the entire distributed storage system, or the average fraction of time when all the storage volumes are bursting. In Eq. 4, BurstFactor is a constant over all storage volumes. However, it could also vary over storage volumes. In one embodiment, BurstFactor is in a range from 0.3-0.4.

The equations given above are merely examples. Other approaches will be apparent. For example, AvgRepFactor, LoadFactor and BurstFactor are shown as constants in the equations above. However, that is not required. In some embodiments, they are adapted over time based on actual activity. AvgRepFactor can be adapted based on actual number of replications, LoadFactor can be adapted based on actual load factor, and BurstFactor can be adapted based on actual burstiness.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of registering new storage volumes to a data storage environment comprising a plurality of storage nodes, the method comprising:
receiving a request to register a new storage volume to a subcluster of one or more storage nodes, wherein quality of service (QOS) parameters specify one or more I/O operations per second (IOPS) requirements for the new storage volume;
determining whether an IOPS capacity of the subcluster is sufficient to accommodate addition of the IOPS requirement for the new storage volume; and
if the TOPS capacity of the subcluster is sufficient, registering the new storage volume to the subcluster,
wherein determining whether an IOPS capacity of the subcluster is sufficient comprises adjusting the IOPS capacity of the subcluster by a replication factor indicative of a number of times storage volumes on the subcluster are replicated on the subcluster.

2. The method of claim 1, wherein the QOS parameters for the new storage volume are specified in service level agreements for the storage volumes.

3. The method of claim 1, wherein the QOS parameters for the new storage volume comprise I/O priority for the storage volume.

4. The method of claim 1, wherein the QOS parameters for the new storage volume comprise a minimum IOPS requirement for the new storage volume.

5. The method of claim 1, wherein the QOS parameters for the new storage volume comprise a maximum TOPS requirement for the new storage volume.

6. The method of claim 1, wherein determining whether an IOPS capacity of the subcluster is sufficient comprises determining whether an IOPS capacity of the subcluster is sufficient to support minimum IOPS requirements for all existing storage volumes on the subcluster plus a minimum IOPS requirement for the new storage volume.

7. The method of claim 6, wherein determining whether an IOPS capacity of the subcluster is sufficient further comprises adjusting the TOPS capacity of the subcluster by a loading factor.

8. The method of claim 7, wherein at least one of the minimum IOPS requirements for the storage volumes are soft requirements and the loading factor is greater than 1.

9. The method of claim 7, wherein the loading factor is less than 1.

10. The method of claim 7, wherein the loading factor is in a range from 0.5-0.75.

11. The method of claim 1, wherein determining whether an IOPS capacity of the subcluster is sufficient comprises determining whether an IOPS capacity of the subcluster is sufficient to support maximum IOPS requirement for all existing storage volumes on the subcluster plus a maximum IOPS requirement for the new storage volume.

12. The method of claim 11, wherein determining whether an IOPS capacity of the subcluster is sufficient further comprises adjusting the maximum IOPS requirement for storage volumes by a burst factor indicative of burstiness of I/O activity on the subcluster.

13. The method of claim 11 wherein the burst factor is in a range from 0.3-0.4.

14. The method of claim 11, wherein the burst factor is adapted over time based on actual burstiness of I/O activity on the subcluster.

15. The method of claim 1, wherein the replication factor is adapted over time based on actual replications on the subcluster.

16. The method of claim 1, further comprising:
providing a notification if the IOPS capacity of the subcluster is not sufficient.

17. The method of claim 1, further comprising:
if the TOPS capacity of the subcluster is not sufficient, then not registering the new storage volume to the subcluster.

18. The method of claim 1, wherein the request to register a new storage volume is received over a network from an application module.

19. A non-transitory computer-readable storage medium storing computer program modules for registering new storage volumes to a data storage environment comprising a plurality of storage nodes, the computer program modules executable to perform steps comprising:
receiving a request to register a new storage volume to a subcluster of one or more storage nodes, wherein quality of service (QOS) parameters specify one or more I/O operations per second (IOPS) requirements for the new storage volume;
determining whether an IOPS capacity of the subcluster is sufficient to accommodate addition of the IOPS requirement for the new storage volume; and
if the TOPS capacity of the subcluster is sufficient, registering the new storage volume to the subcluster,
wherein determining whether an IOPS capacity of the subcluster is sufficient comprises adjusting the IOPS capacity of the subcluster by a replication factor indicative of a number of times storage volumes on the subcluster are replicated on the subcluster.

20. A data storage environment comprising:
a plurality of application nodes that send application read requests and application write requests for data;
a plurality of storage nodes in communication with the application nodes, the storage nodes for storing the data organized as storage volumes;
an orchestration manager module in communication with the application nodes and the storage nodes, the orchestration manager module configured for:
receiving a request from an application node to register a new storage volume to a subcluster of one or more of the storage nodes, wherein quality of service (QOS) parameters specify one or more I/O operations per second (TOPS) requirements for the new storage volume;
determining whether an TOPS capacity of the subcluster is sufficient to accommodate addition of the TOPS requirement for the new storage volume; and
if the TOPS capacity of the subcluster is sufficient, registering the new storage volume to the subcluster,
wherein determining whether an TOPS capacity of the subcluster is sufficient comprises adjusting the TOPS capacity of the subcluster by a replication factor indicative of a number of times storage volumes on the subcluster are replicated on the subcluster.

* * * * *